(12) United States Patent
Choi (10) Patent No.: US 7,675,722 B2
(45) Date of Patent: Mar. 9, 2010

(54) DEVICE TO PROTECT SEMICONDUCTOR DEVICE FROM ELECTROSTATIC DISCHARGE

(75) Inventor: Nak Heon Choi, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 114 days.

(21) Appl. No.: 11/735,007

(22) Filed: Apr. 13, 2007

(65) Prior Publication Data
US 2007/0242400 A1    Oct. 18, 2007

(30) Foreign Application Priority Data
Apr. 18, 2006    (KR)    ............... 10-2006-0035015

(51) Int. Cl.
*H02H 9/00*    (2006.01)
(52) U.S. Cl. ............................................. 361/56
(58) Field of Classification Search ............ 361/56
See application file for complete search history.

(56) References Cited

U.S. PATENT DOCUMENTS

| | | | |
|---|---|---|---|
| 6,388,850 B1 * | 5/2002 | Ker et al. | 361/56 |
| 6,624,992 B1 * | 9/2003 | Aparin | 361/56 |
| 2005/0013073 A1 * | 1/2005 | Cheng et al. | 361/56 |
| 2007/0195472 A1 * | 8/2007 | Kwak et al. | 361/56 |
| 2008/0158749 A1 * | 7/2008 | Kwak et al. | 361/56 |

* cited by examiner

*Primary Examiner*—Ronald W Leja
(74) *Attorney, Agent, or Firm*—Ladas & Parry LLP

(57) ABSTRACT

A device to protect a semiconductor device from electrostatic discharge includes a transferring unit transferring the static electricity inputted to said input/output terminal to the power line, a detecting unit sensing the potential difference between both ends of the transferring unit, located between an input/output terminal and one of the power lines, to output the detection voltage, and a discharging unit driven by said detection voltage and discharging the static electricity led to a specific power line to the other power line, and performs the discharging operation smoothly even with minute electrostatic current and a latter part of the static electricity by using the driving voltage, which is used to drive a conventional detecting unit, as the driving voltage of the ESD protection device, thereby safely protecting an internal circuit of a semiconductor device.

25 Claims, 4 Drawing Sheets

DEVICE TO PROTECT SEMICONDUCTOR DEVICE FROM ELECTROSTATIC DISCHARGE

CROSS-REFERENCE TO RELATED APPLICATIONS

The present application claims priority to Korean patent application number 10-2006-0035015 filed on Apr. 18, 2007, which is incorporated herein by reference in its entirety.

BACKGROUND OF THE INVENTION

The present invention relates to a device to protect a semiconductor device from electrostatic discharge (ESD), and more particularly, to a device that protects the semiconductor device from ESD and resulting damage from the ESD.

Generally, electrostatic discharge (ESD) is one of the important factors that can adversely influence the reliability of a semiconductor device. Such electrostatic phenomenon can be classified into a human body model (HBM), a machine model (MM) and a charge device model (CDM) according to causes of the occurrence of the static electricity. The HBM is an electrostatic phenomenon resulting from a human body, the MM is an electrostatic phenomenon resulting from contact with a measuring machine and the CDM is a phenomenon in which static electricity accumulated in a device is instantly discharged by grounding with the outside.

If the static electricity is inputted to a semiconductor device, it flows intensively to the weakest portion of the semiconductor device. Because of this, a junction, a contact, a gate oxide film or other components located inside of the semiconductor device are melted, thereby resulting in failure. Therefore, the semiconductor device is necessarily provided with an ESD protection device in every input/output area in order to protect an internal circuit from electrostatic current.

Particularly, the thickness of the gate insulation film of a transistor consisting of an input/output buffer is more reduced with the development of manufacturing technology of semiconductor devices and thus an internal circuit can be more easily damaged. In other words, if the thickness of the gate insulation film of a transistor is reduced, the voltage breaking the gate insulation film is lowered, and thus the gate insulation film of the transistor may be broken by static electricity with the lower voltage in the case of using a conventional ESD protection device. To solve this problem, it is suggested to use a method in which a transistor is used in an ESD protection device.

Figure 1:
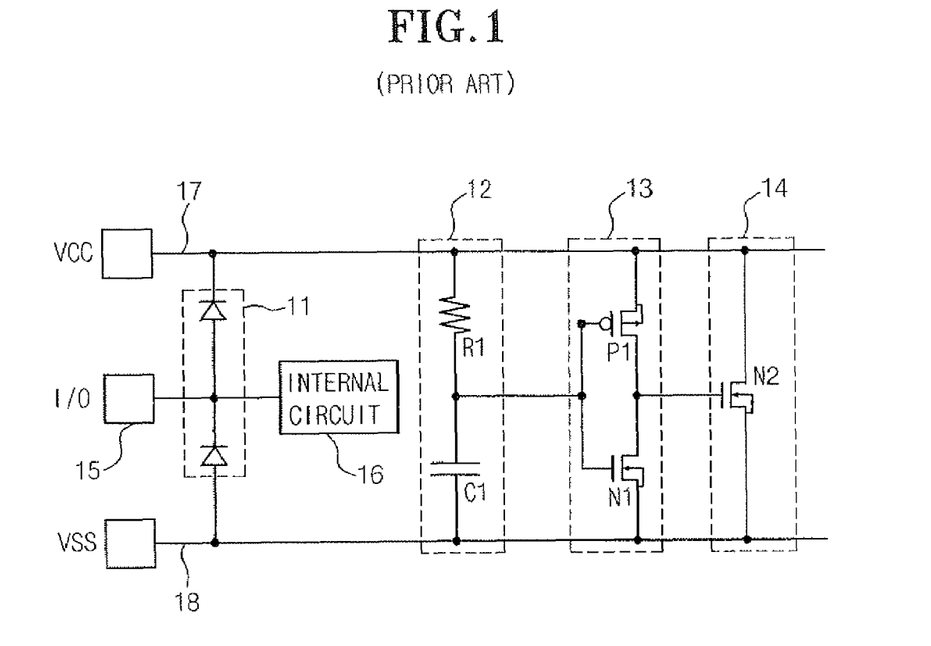
FIG. 1 is a circuit diagram illustrating a conventional device to protect a semiconductor device from electrostatic discharge (ESD).

A conventional device to protect a semiconductor from an ESD, as shown in FIG. 1, includes a transferring unit 11, a detecting unit 12, a driver 13 and a discharging unit 14.

The transferring unit 11 transfers static electricity inputted to the semiconductor device through an input/output terminal 15 to an external voltage (VCC) line 17.

The detecting unit 12 includes a resistance element R1 and a capacitor C1 serially connected between the external voltage line 17 and a grounding voltage (VSS) line 18, and detects the static electricity inputted to the external voltage line 17.

The driver 13 includes a CMOS type buffer formed by a PMOS transistor P1 and a NMOS transistor N1 serially connected between the external voltage line 17 and the grounding voltage line 18, and is enabled by the detecting unit 12 to drive the discharging unit 14.

The discharging unit 14 includes a NMOS transistor N2 connected between the external voltage line 17 and the grounding voltage line 18, and is driven by the driver 13 to interconnect the external voltage line 17 and the grounding voltage line 18.

Referring to operation of the conventional device that protects a semiconductor from an ESD, if static electricity is inputted from the input/output terminal 15, then static electricity is transferred to the external voltage line 17 by the transferring unit 11. The detecting unit 12 detects the voltage drop generated in the node located between the resister R1 and the capacitor C1 in response to the alternating current in a rising time at the initial stage of generation of the static electricity, and applies it to the driver 13. Then, since the PMOS transistor P1 of the driver 13 is turned on and the gate voltage of the NMOS transistor N2 of the discharging unit 14 is raised, thus turning on the NMOS transistor N2, the external voltage line 17 and the grounding voltage line 18 are interconnected and thus the static electricity transferred to the external voltage line 17 is discharged to the grounding voltage line 18. As a result, the device protecting the semiconductor device from ESD protects the internal circuit 16 of the semiconductor device from the static electricity inputted to the input/output terminal 15.

In conventional ESD protection devices voltage drop is rapidly generated during the alternating current brought about by the characteristics of the high rising time. In the initial stage of the static electricity, current flows to the capacitor C1 of the detecting unit 12 and passes through the resistance element R1, in which the device is operated prior to the junction breakdown time of the PMOS transistor P1 of the driver 13.

However, the voltage drop generated in the detecting unit 12 is limited to the alternating current in the rising section of the static electricity and therefore the time in which the detection voltage is detected is short. In other words, since the operational duration of the device is short, it is difficult to protect the internal circuit 16 from the static electricity. As a result, the internal circuit 16 may be damaged in sections due to the relatively rapid rise and fall of the static electricity.

Figure 2:
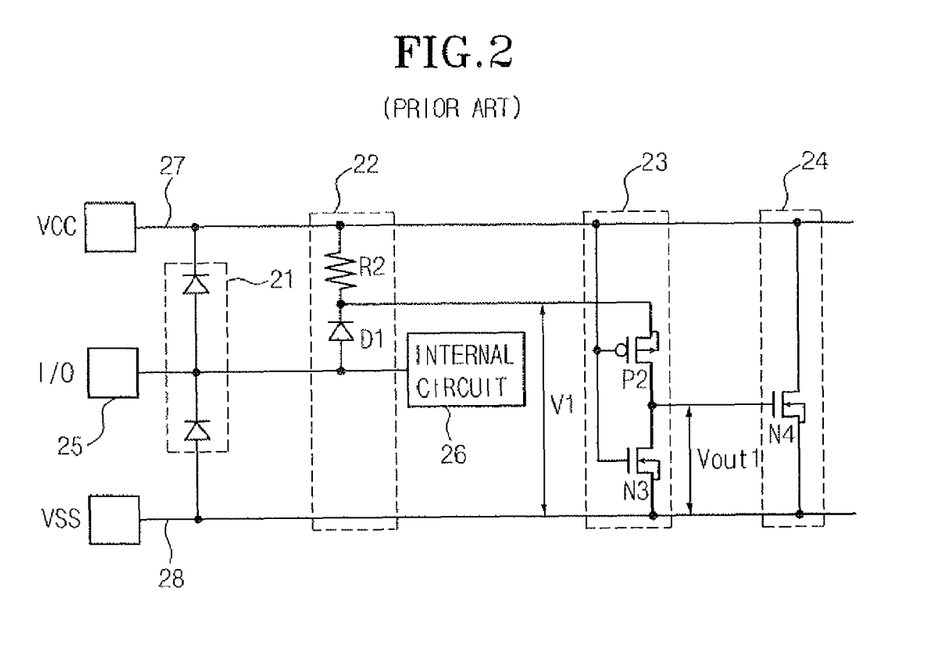
FIG. 2 is a circuit diagram illustrating another conventional device to protect a semiconductor device from ESD.

To solve the above problem, the present applicant applied a circuit as shown in FIG. 2 as Korean Patent Application No. 2004-0114210, and the circuit shown in FIG. 2 includes a differently structured detecting unit 22 that detects electrostatic current transferred to the external voltage line 27 and drives a driver 23 by the detection voltage responding to the detected electrostatic current.

The device used to protect the semiconductor device from ESD as shown in FIG. 2 is provided with a transferring unit 21, the detecting unit 22, a driver 23 and a discharging unit 24.

The transferring unit 21 transfers static electricity inputted through an input/output terminal 25 to the external voltage line 27.

The detecting unit 22 includes a resistance element R2 and a diode D1 serially connected between the external voltage line 27 and the grounding voltage line 28, and responds to the electrostatic current flowing on the external voltage line 27.

The driver 23 includes a CMOS type buffer having a PMOS transistor P2 and a NMOS transistor N3 serially connected between the output terminal of the detecting unit 22 and the grounding voltage line 28, and is turned on by the detecting unit 22 to drive the discharging unit 24. Here, the gate of each of the transistors P2 and N3 is connected to the external voltage line 27 and the source of the PMOS transistor P2 is connected to the output terminal of the detecting unit 22.

The discharging unit 24 includes a NMOS transistor N4 connected between the external voltage line 27 and the grounding voltage line 28, and is driven by the driver 23 to interconnect the external voltage line 27 and the grounding voltage line 28.

Referring to operation of the further conventional device to protect a semiconductor from an ESD, static electricity inputted from the input/output terminal 25 is transferred to the external voltage line 27 by the transferring unit 21.

The detecting unit 22 transfers some of the static electricity inputted to the input/output terminal 25 through the diode D1 to the external voltage line 27 while sensing the electrostatic current inputted to the external voltage line 27, and detects the voltage dropped by the resistance element R2 in response to the electrostatic current to apply to the driver 23.

Then, since the PMOS transistor P2 of the driver 23 is turned on and the gate voltage of the NMOS transistor N4 of the discharging unit 24 is raised, then the NMOS transistor N4 is turned on. Also since the external voltage line 27 and the grounding voltage line 28 are interconnected then the static electricity transferred to the external voltage line 27 is discharged to the grounding voltage line 28.

As a result, the device protects the semiconductor device from ESD damage by protecting the internal circuit 26 of the semiconductor device from the static electricity inputted to the input/output terminal 25.

In such a conventional device to protect the semiconductor device from ESD as described above, the detecting unit 22 continuously detects the detection voltage in a section, when the electrostatic current flowing to the external voltage line 27 is larger than a predetermined value to drive the driver 23 so that the discharging time of the device can be extended.

Figure 3:
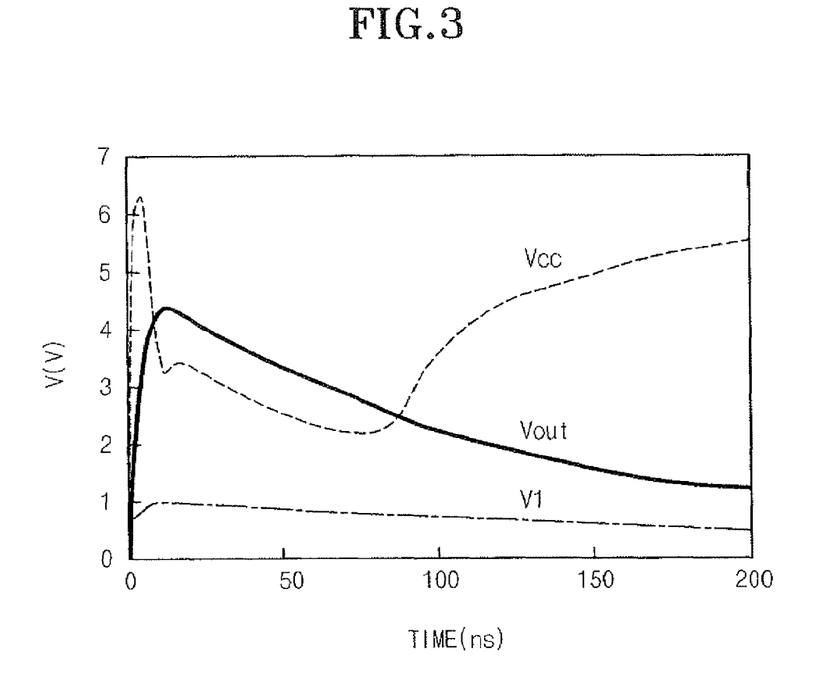
FIG. 3 is a graph illustrating a voltage that is applied to the gate of the discharging unit of the conventional device to protect a semiconductor device from ESD shown in FIG. 2.

However, as shown in FIG. 3, a voltage Vout, is applied to the gate of the discharging unit 24 of the conventional device to protect the semiconductor device from ESD damage. Shown in FIG. 2, is the detection voltage V1 which is detected in the detecting unit 22 which is then transferred through the driver 23 and depends on the detection voltage V1. A forward turn-on of the diode D1 must then occur in order to detect the detection voltage V1 in the detecting unit 22. In other words, the driving voltage of the diode D1 must be necessarily greater than the predetermined voltage (approximately 0.7V). In this case, the operation of the device is not sufficient and may damage the internal circuit 26 of the semiconductor device during a later part of the pulse in which the static electricity becomes small.

SUMMARY OF THE INVENTION

The present invention provides a device to protect a semiconductor device from electrostatic discharge (ESD), which can safely protect an internal circuit from static electricity by performing smoothly a discharging operation with minute current in a latter part of the static electricity.

The device to protect a semiconductor device from electrostatic discharge according to an embodiment of the present invention comprises, when the device is positioned between an external voltage line and a grounding voltage line, in order to protect an internal circuit of the semiconductor device from the static electricity inputted to an input/output terminal, a transferring unit transferring the static electricity inputted to the input/output terminal to one of the power lines; a detecting unit sensing the potential difference between both ends of the transferring unit, connected between the input/output terminal and one of the power lines, to output the detection voltage; and a discharging unit driven by the detection voltage and connecting the specific power line and the other power line to form a discharge path for the static electricity.

The transferring unit includes a first diode having a cathode connected to the external voltage line and an anode connected to the input/output terminal and a second diode having a cathode connected to the input/output terminal and an anode connected to the grounding voltage line.

Further, the detecting unit includes a MOSFET transistor and a resister, which are serially connected between the input/output terminal and one of the power lines.

Preferably, the MOSFET has a source connected to the input/output terminal, a gate connected to one of the power lines and a drain connected to the resister.

In addition, the detecting unit further includes a capacitor connected between the resister and one of the power lines.

Furthermore, the device for use in protecting a semiconductor device from ESD damage further comprises an amplifying unit connected in parallel to the detecting unit and the discharging unit and amplifying the detection voltage inputted from the detecting unit to transfer to the discharging unit. The amplifying unit may be provided with an even number of CMOS type inverters.

Another device for use in protecting a semiconductor device from electrostatic discharge damage according to an embodiment of the present invention comprises, when placed between an external voltage line and a grounding voltage line, in order to protect an internal circuit of the semiconductor device from the static electricity inputted to an input/output terminal, a transferring unit transferring the static electricity inputted to the input/output terminal to the grounding voltage line; a detecting unit that senses the potential difference between both ends of the transferring unit, connected between the input/output terminal and the grounding voltage line, to output the detection voltage; and a discharging unit driven by the detection voltage and connecting the external voltage line and the grounding voltage line to form a discharging path for the static electricity.

The transferring unit includes a first diode having a cathode connected to the external voltage line and an anode connected to the input/output terminal and a second diode having a cathode connected to the input/output terminal and an anode connected to the grounding voltage line.

Further, the detecting unit may include a NMOS transistor having a gate connected to the grounding voltage line and a source connected to the input/output terminal and a resister connected between a drain of the NMOS transistor and the grounding voltage line.

In addition, the discharging unit may include a PMOS transistor connected between the external voltage line and the grounding voltage line.

Still yet another embodiment of the device for use in protecting a semiconductor device from electrostatic discharger according to the present invention comprises, when connected between an external voltage line and a grounding voltage line, in order to protect an internal circuit of the semiconductor device from the static electricity inputted to an input/output terminal, comprises a transferring unit transferring the static electricity inputted to the input/output terminal to the external voltage line; a detecting unit sensing the potential difference between both ends of the transferring unit, connected between the input/output terminal and the external voltage line, to output the detection voltage; and a discharging unit driven by the detection voltage and connecting the external voltage line and the grounding voltage line to form a discharging path for the static electricity.

The transferring unit includes a first diode having a cathode connected to the external voltage line and an anode connected to the input/output terminal and a second diode having a cathode connected to the input/output terminal and an anode connected to the grounding voltage line.

In addition, the detecting unit includes a PMOS transistor having a gate connected to the external voltage line and a source connected to the input/output terminal and a resister connected between a drain of the PMOS transistor and the grounding voltage line.

Furthermore, the discharging unit may also include a NMOS transistor connected between the external voltage line and the grounding voltage line.

Still yet another embodiment of the device for use in protecting a semiconductor device from electrostatic discharge damage, according to the present invention comprises, when placed between an external voltage line and a grounding voltage line in order to protect an internal circuit of the semiconductor device from the static electricity inputted to an input/output terminal, comprises: a transferring unit transferring the static electricity inputted to the input/output terminal to the external voltage line; a detecting unit sensing the potential difference between both ends of the transferring unit, connected between the input/output terminal and the external voltage line, to output the detection voltage; an amplifying unit amplifying the detection voltage inputted from the detecting unit to output the amplified detection voltage; and a discharging unit driven by output from the amplifying unit and connecting the external voltage line and the grounding voltage line to form a discharging path for the static electricity.

The transferring unit includes a first diode having a cathode connected to the external voltage line and an anode connected to the input/output terminal and a second diode having a cathode connected to the input/output terminal and an anode connected to the grounding voltage line.

In addition, the detecting unit includes a PMOS transistor having a gate connected to the external voltage line and a source connected to the input/output terminal and a resister connected between a drain of the PMOS transistor and the grounding voltage line.

Preferably, the amplifying unit is provided with an even number of CMOS type inverters.

Furthermore, the discharging unit includes a NMOS transistor connected between the external voltage line and the grounding voltage line.

Even yet another embodiment of the device for use in protecting a semiconductor device from damage brought about by electrostatic discharge, according to the present invention comprises, when placed between an external voltage line and a grounding voltage line, in order to protect an internal circuit of the semiconductor device from the static electricity inputted to an input/output terminal, comprises: a transferring unit transferring the static electricity inputted to the input/output terminal to the external voltage line; a first detecting unit detecting the voltage drop in response to alternating current in an initial rising section of the static electricity, which is transferred to the external voltage line as the first detection voltage; a second detecting unit sensing the potential difference between both ends of the transferring unit, connected between the input/output terminal and the external voltage line, to output a second detection voltage; and a discharging unit driven by the first and second detection voltages and connecting the external voltage line and the grounding voltage line to form a discharging path for the static electricity.

The transferring unit includes a first diode having a cathode connected to the external voltage line and an anode connected to the input/output terminal and a second diode having a cathode connected to the input/output terminal and an anode connected to the grounding voltage line.

The first detecting unit includes a capacitor and a resister, which are serially connected between the external voltage line and the grounding voltage line.

In addition, the second detecting unit includes a PMOS transistor having a gate connected to the external voltage line and a drain connected to the first detecting unit.

Preferably, the first and second detecting unit provide the first and second detection voltage, respectively, to the discharging unit as a common input.

Preferably, the first and second detecting unit provide the first and second detection voltage respectively to the discharging unit using a shared resister.

Furthermore, the discharging unit includes a NMOS transistor connected between the external voltage line and the grounding voltage line.

DETAILED DESCRIPTION OF SPECIFIC EMBODIMENTS

Practical and presently preferred embodiments of the present invention are illustrative as shown in the following Examples and Comparative Examples.

However, it will be appreciated that those skilled in the art, on consideration of this disclosure, may make modifications and improvements within the spirit and scope of the present invention.

Figure 4:
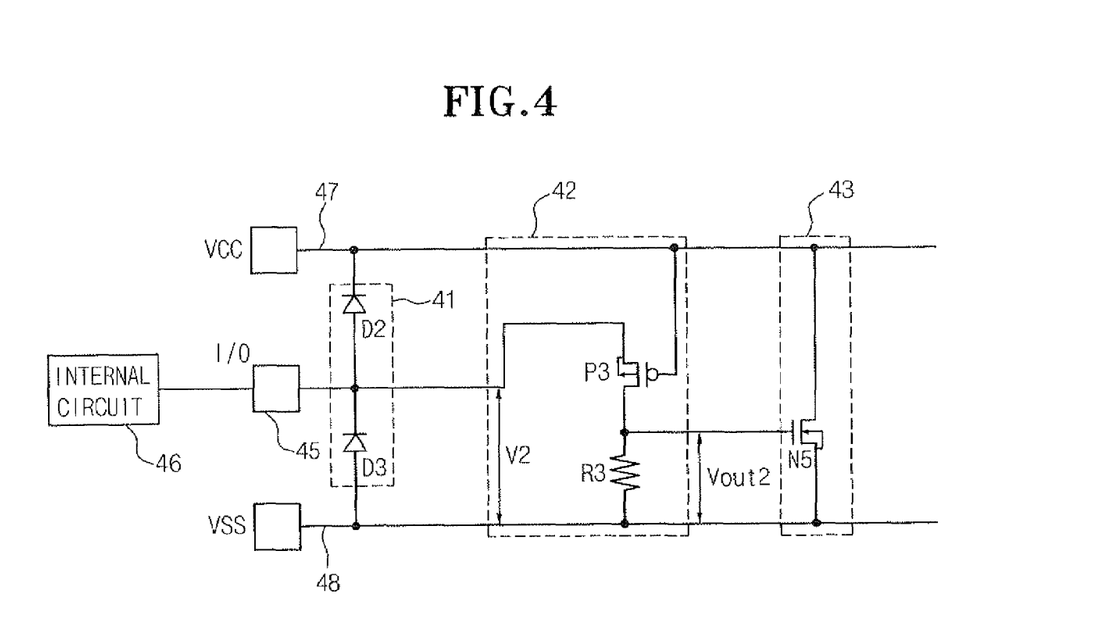
FIG. 4 is a circuit diagram illustrating a device to protect a semiconductor device from ESD according to a first embodiment of the present invention.

FIG. 4 is a circuit diagram illustrating a device for use in protecting a semiconductor device from ESD damage according to a first embodiment of the present invention.

The device to protect a semiconductor device from ESD according to a first embodiment of the present invention is provided with a transferring unit 41, a detecting unit 42 and a discharging unit 43.

The transferring unit 41 includes diodes D2 and D3, which are serially connected between an external voltage line 47 and a grounding voltage line 48. A cathode of the diode D2 is connected to the external voltage line 47 and an anode of the diode D3 is connected to the grounding voltage line 48. The transferring unit 41 transfers static electricity to the external voltage line 47 so that the static electricity inputted from the input/output terminal 45 is not transferred to an internal circuit.

The detecting unit 42 includes a PMOS transistor P3 and a resistance element R3, which are serially connected between the input/output terminal 45 and the grounding voltage line 48. Here, the gate of the PMOS transistor 23 is connected to the external voltage line 47, the source to the input/output terminal 45 and the drain to the resistance element R3.

The discharging unit 43 includes a NMOS transistor N5 connected between the external voltage line 47 and the grounding voltage line 48. The drain of the NMOS transistor N5 is connected to the external voltage line 47, the source to the grounding voltage line 48 and the gate to an output terminal of the detecting unit 42.

Referring to the operation of the device to protect a semiconductor from an ESD according to the first embodiment of the present invention, the transferring unit 41 leads the static electricity to the power lines 47 and 48 so that the static electricity inputted through the input/output terminal 45 is not transferred to the internal circuit 46.

When transferring the static electricity inputted from the input/output terminal 45 through the diode D2 of the transferring unit 41 to the external voltage line 47, the voltage drop can be generated by a parasitic resister (not shown) of the diode D2. As the result, the voltage drop is generated between the external voltage line 47 and the input/output terminal 45.

The detecting unit 42 is turned on as the voltage dropped across by the parasitic resister of the diode D2 and is applied to the gate of the PMOS transistor P3, and applies a detection voltage Vout2 dropped by the resistance element R3 to the gate of the discharging unit 43.

If the detection voltage applied to the gate of the NMOS transistor N5 is raised, thus turning on the discharging unit 43, the discharging unit 43 interconnects the external voltage line 47 and the grounding voltage line 48 to discharge the static electricity led to the external voltage line 47 to the grounding voltage line 48. As a result, the device for use in protecting a semiconductor device from ESD protects the internal circuit 46 of the semiconductor device from the static electricity inputted to the input/output terminal 45.

As such, in the device for use in protecting a semiconductor device from ESD damage, according to the first embodiment of the present invention, the discharging operation can be sufficiently performed even in a latter part of a pulse in which an electrostatic current becomes small by using the voltage, which has been lost as a driving voltage of the diode D1 in the conventional detecting unit 22, as the driving voltage of the ESD protection device.

Figure 5:
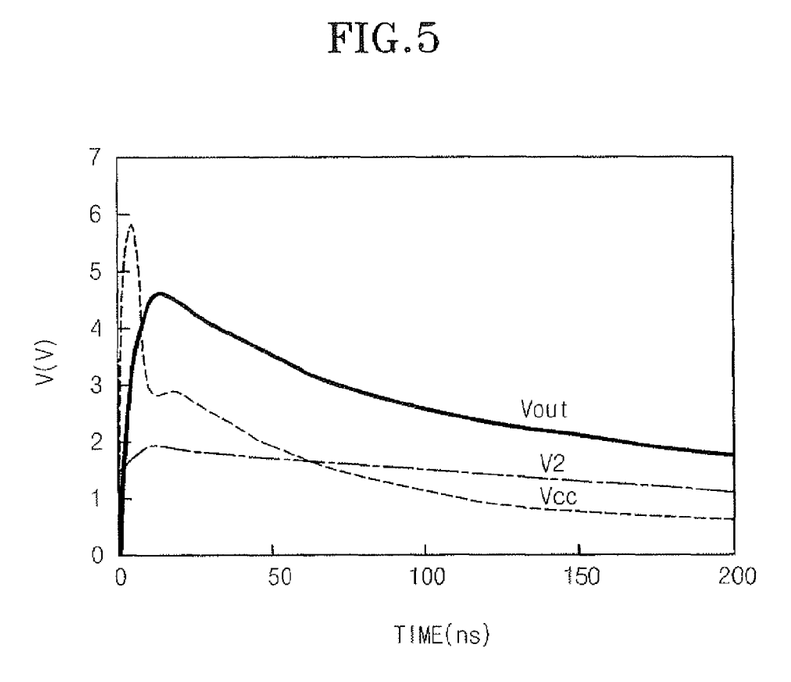
FIG. 5 is a graph illustrating a voltage that is applied to the gate of the discharging unit of the device to protect a semiconductor device from ESD of the present invention shown in FIG. 4.

FIG. 5 is a graph illustrating the voltage that is applied to the gate of the discharging unit 43 of the device to protect a semiconductor device from ESD of the present invention shown in FIG. 4.

Referring to FIG. 5, the voltage Vout2 applied to the gate of the discharging unit 43 is influenced by the detection voltage V2 detected in the detecting unit 42. However, since it is not necessary for the driving voltage (approximately 0.7V [0.7→0.7V]) for turning on the diode D1 as shown in FIG. 2, the detection voltage V2 of the present invention is larger by approximately 0.7V than the conventional detection voltage V1 in FIG. 3. Therefore, the voltage Vout2 applied to the gate of the discharging unit 43 is higher than the voltage Vout1 applied to the gate of the conventional discharging unit 24 in FIG. 2. Thus, the discharging operation can be sufficiently performed even in a latter part of a pulse in which an electrostatic current becomes small and is thereby capable of protecting the internal circuit 46 of the semiconductor device.

Figure 6:
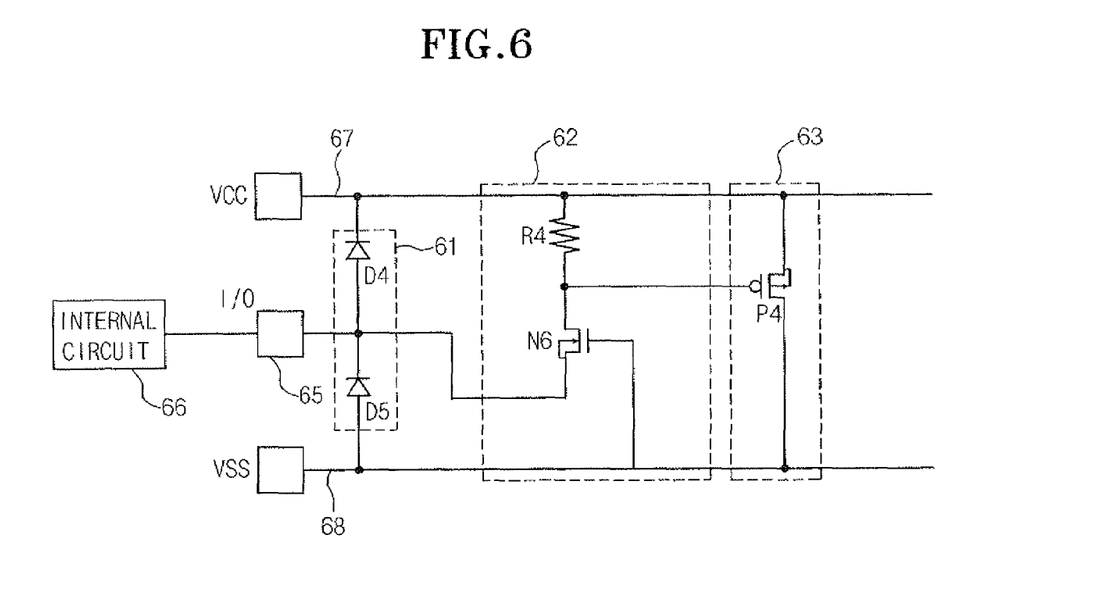
FIG. 6 is a circuit diagram illustrating a device to protect a semiconductor device from ESD according to a second embodiment of the present invention.
Figure 7:
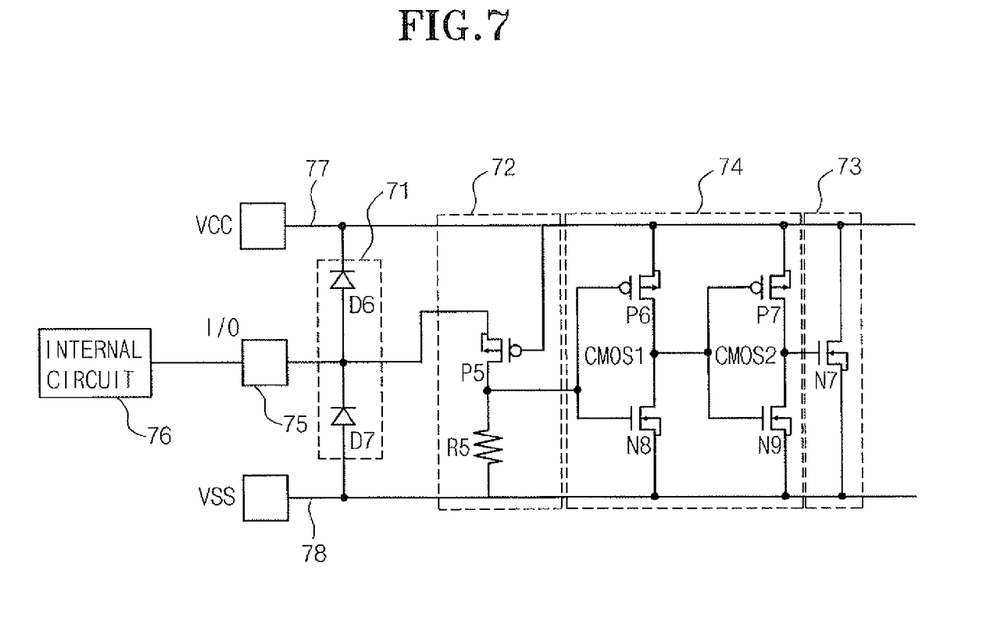
FIG. 7 is a circuit diagram illustrating a device to protect a semiconductor device from ESD according to a third embodiment of the present invention.
Figure 8:
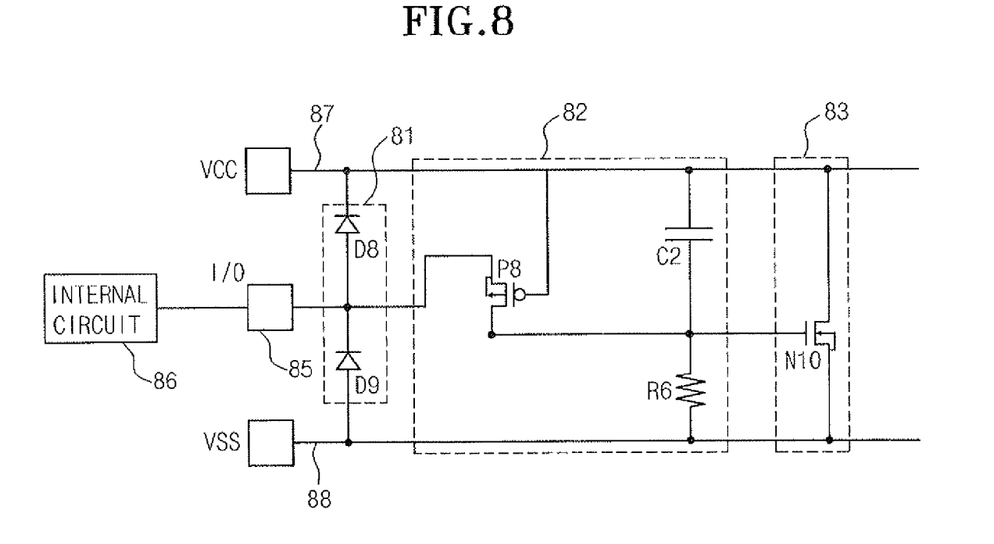
FIG. 8 is a circuit diagram illustrating a device to protect a semiconductor device from ESD according to a fourth embodiment of the present invention.

FIGS. 6 to 8 are circuit diagrams illustrating devices for use in protecting a semiconductor device from ESD damage, according to the second, third and Fourth embodiments of the present invention.

Only those portions different from the elements of FIG. 4 will be described hereinafter.

The device to protect a semiconductor device from ESD according to the second embodiment of the present invention shown in FIG. 6 is adapted to protect an internal circuit 66 from negative (−) static electricity inputted to the input/output terminal 65 in a case in which the elements in the internal circuit 66 connected to the external voltage line 67 are very weak.

In FIG. 6 a PMOS transistor P4 is provided as a discharging unit 63 unlike the first embodiment in which a NMOS transistor N5 is provided as the discharging unit 43, as shown in FIG. 4. Further, the detecting unit 62 includes a resistance element R4 and a NMOS transistor N6, which are serially connected between the external voltage line 67 and a grounding voltage line 68. Here, the gate of the NMOS transistor N6 is connected to the grounding voltage line 68, the drain to the input/output terminal and the source to the resistance element R4.

Referring to the operation of the device to protect a semiconductor from an ESD according to the second embodiment of the present invention, if negative (−) static electricity is inputted to the input/output terminal 65, the voltage of the grounding voltage line 68 is inputted to the input/output terminal 65 through the diode D5 of the transferring unit 61. At this time, the voltage drop is generated across the parasitic resister (not shown) of the diode D5. Thus, the NMOS transistor N6 of the detecting unit 62 is turned on to apply voltage applied to the common connection terminal of the resistance element R4 and the NMOS transistor N6 to the gate of the discharging unit 63.

If the detection voltage applied to the gate of the PMOS transistor P5 is lowered, thus turning on the discharging unit 63, the discharging unit 63 interconnects the external voltage line 67 and the grounding voltage line 68 to flow and discharge the current from the external voltage line 67 to the grounding voltage line 68. As a result, the device for use in protecting a semiconductor device from ESD damage, protects the internal circuit 66 of the semiconductor device from the static electricity inputted to the input/output terminal 65.

The device for use in protecting a semiconductor device from ESD according to the third embodiment of the present invention shown in FIG. 7 is further provided with an amplifying unit 74 between the detecting unit 72 and the discharging unit 73 to enhance the driving ability of the discharging unit 73.

The amplifying unit 74 includes two CMOS type inverters having a PMOS transistor and a NMOS transistor, which are serially connected between the external voltage line 77 and the grounding voltage line 78.

Discharging operation can be performed more stably as the detection voltage detected in the detecting unit 72 is sufficiently amplified by the amplifying unit 74 and then applied to the discharging unit 73. Thus, the device to protect a semiconductor device from ESD protects the internal circuit 76 of the semiconductor device from the static electricity inputted to the input/output terminal 75.

The device for use in protecting a semiconductor device from ESD damage according to the fourth embodiment of the present invention shown in FIG. 8 includes as a detecting unit 82 a PMOS transistor P8 and resistance element R6, which are serially connected between an input/output terminal 85 and a grounding voltage line 88, and a capacitor C2 connected between the output end of the PMOS transistor P8 and the external voltage line 87.

Thus, the detecting unit 82 senses the potential difference between both ends of the transferring unit 81 across all of a section. In which static electricity is generated to apply the detected voltage to the gate of the discharging unit 83, and detects the voltage dropped across the resistance element R6 through the capacitor C2 when alternating current flows rapidly in the initial stage of the static electricity to apply it to the discharging unit 83, thereby driving the discharging unit 83 to more rapidly protect an internal circuit 86 of a semiconductor device.

As described above, the present invention performs the discharging operation smoothly even with minute electrostatic current and uses a latter part of the static electricity by using the driving voltage, which is used to drive a conventional detecting unit, as the driving voltage of the ESD protection device, thereby more safely protecting an internal circuit of a semiconductor device.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. An electrostatic discharge protection device constructed between an external voltage line and a grounding voltage line for protecting an internal circuit of the semiconductor device from the static electricity inputted to an input/output terminal, comprising:
    a first transferring unit transferring the static electricity inputted to said input/output terminal to said grounding voltage line;
    a detecting unit that senses the potential difference between both ends of said first transferring unit, connected between an input directly connected to said input/output terminal and an output connected to said grounding voltage line, to output the detection voltage; and
    a discharging unit driven by said detection voltage and connecting said external voltage line and said grounding voltage line to form a discharging path for the static electricity,
    wherein the detecting unit is turned on from a voltage drop from the first transferring unit transferring the static electricity inputted to said input/output terminal to said grounding voltage line,
    wherein said detecting unit includes a NMOS transistor having a gate connected to said grounding voltage line, a source directly coupled to said input/output terminal and a resister connected between a drain of said NMOS transistor and said external voltage line.

2. The electrostatic discharge protection device of claim 1, wherein said first transferring unit includes a diode having a cathode connected to said input/output terminal and an anode connected to said grounding voltage line.

3. The electrostatic discharge protection device of claim 1, wherein said discharging unit includes a PMOS transistor connected between said external voltage line and said grounding voltage line.

4. The electrostatic discharge protection device of claim 1, further comprising a second transferring unit transferring the static electricity inputted to said input/output terminal to said external voltage line.

5. The electrostatic discharge protection device of claim 4, wherein the second transferring unit includes a diode having an anode connected to said input/output terminal and a cathode connected to said external voltage line.

6. An electrostatic discharge protection device for use in protecting a semiconductor device from electrostatic discharge, constructed between an external voltage line and a grounding voltage line in order to protect an internal circuit of the semiconductor device from the static electricity inputted to an input/output terminal, comprising:
    A first transferring unit transferring the static electricity inputted to said input/output terminal to said external voltage line;
    a detecting unit sensing the potential difference between both ends of said transferring unit, connected between an input directly connected to said input/output terminal and an output connected to said external voltage line, to output the detection voltage; and
    a discharging unit driven by said detection voltage and connecting said external voltage line and said grounding voltage line to form a discharging path for the static electricity,
    wherein the detecting unit is turned on from a voltage drop from the transferring unit transferring the static electricity inputted to said input/output terminal to said external voltage line,
    wherein said detecting unit includes a PMOS transistor having a gate connected to said external voltage line, a source directly coupled to said input/output terminal and a resister connected between a drain of said PMOS transistor and said grounding voltage line.

7. The electrostatic discharge protection device of claim 6, wherein said first transferring unit includes a diode having a cathode connected to said external voltage line and an anode connected to said input/output terminal.

8. The electrostatic discharge protection device of claim 6, wherein said discharging unit includes a NMOS transistor connected between said external voltage line and said grounding voltage line.

9. The electrostatic discharge protection device of claim 6, further comprising a second transferring unit transferring the static electricity inputted to said input/output terminal to said grounding voltage line.

10. The electrostatic discharge protection device of claim 9, wherein the second transferring unit includes a diode having a cathode connected to said input/output terminal and an anode connected to said grounding voltage line.

11. An electrostatic discharge protection device constructed between an external voltage line and a grounding voltage line for protecting an internal circuit of the semiconductor device from the static electricity inputted to an input/output terminal, comprising:
    a first transferring unit transferring the static electricity inputted to said input/output terminal to said external voltage line;
    a detecting unit sensing a potential difference between both ends of said first transferring unit, connected between an input directly connected to said input/output terminal and an output connected to said external voltage line, to output the detection voltage;
    an amplifying unit amplifying said detection voltage inputted from said detecting unit to output the amplified detection voltage; and a discharging unit driven by the output from said amplifying unit and connecting said external voltage line and said grounding voltage line to form a discharging path for the static electricity, wherein the detecting unit is turned on from a voltage drop from the transferring unit transferring the static electricity inputted to said input/output terminal to said external voltage line, wherein said detecting unit includes a PMOS transistor having a gate connected to said external voltage line, a source directly coupled to said input/output terminal and a resister connected between a drain of said PMOS transistor and said grounding voltage line.

12. The electrostatic discharge protection device of claim 11, wherein said first transferring unit includes a diode having a cathode connected to said external voltage line and an anode connected to said input/output terminal.

13. The electrostatic discharge protection device of claim 11, said amplifying unit provided with an even number of CMOS type inverters.

14. The electrostatic discharge protection device of claim 11, wherein said discharging unit includes a NMOS transistor connected between said external voltage line and said grounding voltage line.

15. The electrostatic discharge protection device of claim 11, further comprising a second transferring unit transferring the static electricity inputted to said input/output terminal to said grounding voltage line.

16. The electrostatic discharge protection device of claim 15, wherein the second transferring unit includes a diode having a cathode connected to said input/output terminal and an anode connected to said grounding voltage line.

17. An electrostatic discharge protection device for use in protecting a semiconductor device from electrostatic discharge damage, when constructed between an external voltage line and a grounding voltage line, in order to protect an internal circuit of the semiconductor device from the static electricity inputted to an input/output terminal, comprising:

a first transferring unit transferring the static electricity inputted to said input/output terminal to said external voltage line;

a first detecting unit detecting the voltage drop in response to alternating current in an initial rising section of said static electricity, which is transferred to said external voltage line as a first detection voltage;

a second detecting unit sensing a potential difference between both ends of said first transferring unit, connected between said input/output terminal and said external voltage line, to output a second detection voltage; and a discharging unit driven by said first and second detection voltages and connecting said external voltage line and said grounding voltage line to form a discharging path for the static electricity.

18. The electrostatic discharge protection device of claim 17, wherein said first transferring unit includes a diode having a cathode connected to said external voltage line and an anode connected to said input/output terminal.

19. The electrostatic discharge protection device of claim 17, wherein said first detecting unit includes a capacitor and a resister, which are serially connected between said external voltage line and said grounding voltage line.

20. The electrostatic discharge protection device of claim 17, wherein said second detecting unit includes a PMOS transistor having a gate connected to said external voltage line and a drain connected to said first detecting unit.

21. The electrostatic discharge protection device of claim 17, wherein said first and second detecting units provide said first and second detection voltages, respectively, to said discharging unit as a common input.

22. The electrostatic discharge protection device of claim 21, wherein said first and second detecting units provide said first and second detection voltage respectively to said discharging unit using a shared resister.

23. The electrostatic discharge protection device of claim 17, wherein said discharging unit includes a NMOS transistor connected between said external voltage line and said grounding voltage line.

24. The electrostatic discharge protection device of claim 17, further comprising a second transferring unit transferring the static electricity inputted to said input/output terminal to said grounding voltage line.

25. The electrostatic discharge protection device of claim 24, wherein the second transferring unit includes a diode having a cathode connected to said input/output terminal and an anode connected to said grounding voltage line.

* * * * *